United States Patent [19]
Damerau

[11] Patent Number: 5,390,359
[45] Date of Patent: Feb. 14, 1995

[54] STORING AND RETRIEVING RECORDS IN A COMPUTER SYSTEM

[75] Inventor: Frederick J. Damerau, North Salem, N.Y.

[73] Assignee: International Business Machines Corporation, Armonk, N.Y.

[21] Appl. No.: 854,170

[22] Filed: Mar. 20, 1992

[51] Int. Cl.$^6$ .............................................. G06F 7/00
[52] U.S. Cl. .................. 395/800; 364/966.1; 364/DIG. 2
[58] Field of Search .................. 341/55; 395/275, 800, 395/425, 575; 364/419.11

[56] References Cited

U.S. PATENT DOCUMENTS

| | | | |
|---|---|---|---|
| 3,681,781 | 8/1972 | Batcher | 395/800 |
| 4,290,105 | 9/1981 | Cichelli | 395/575 |
| 4,897,785 | 1/1990 | Züger | 395/425 |
| 4,899,128 | 2/1990 | Shapiro | 340/146.2 |
| 5,032,987 | 7/1991 | Broder | 395/200 |

OTHER PUBLICATIONS

Faloutsos, "Gray Codes for Partial Match and Range Queries", IEEE Transaction on Software Engineering vol. 14 No. 10, (Oct. 1988) pp. 1381-1393.

Primary Examiner—Thomas G. Black
Assistant Examiner—Jennifer M. Orzech
Attorney, Agent, or Firm—Douglas W. Cameron

[57] ABSTRACT

A method and apparatus for determining whether a record, or an edited version thereof, is stored in a computer system. With this invention, whenever a record is stored in the system a hash function is applied to subsets of a key representing the record to be stored to generate multiple hash addresses. A copy of the key, or pointer thereto, is stored at each of the generated hash addresses. Whenever one wishes to determine whether a key is stored in the system, a hash function is applied to subsets of the test record to generate multiple hash addresses. The key for the test record then compared with the key stored in each of the generated hash addresses. If the key for the test record is sufficiently close to anyone of the keys found at the hash addresses, the test record is assumed to be stored in the system.

6 Claims, 4 Drawing Sheets

FIG. 2

TABLE T

| | | | | | | | | |
|---|---|---|---|---|---|---|---|---|
| 1 | 1 | 7 | 86 | 102 | 133 | 144 | 154 | 206 | 256 |
| 2 | 1 | 67 | 74 | 82 | 84 | 135 | 158 | 198 | 256 |
| 3 | 1 | 10 | 23 | 65 | 94 | 208 | 213 | 233 | 256 |
| 4 | 1 | 18 | 85 | 100 | 161 | 202 | 219 | 246 | 256 |
| 5 | 1 | 29 | 36 | 87 | 139 | 147 | 184 | 229 | 256 |
| 6 | 1 | 11 | 16 | 26 | 57 | 76 | 132 | 177 | 256 |
| 7 | 1 | 47 | 18 | 79 | 87 | 166 | 145 | 240 | 256 |

R=7

N=9

STORING AND RETRIEVING RECORDS IN A COMPUTER SYSTEM

TECHNICAL FIELD

This invention relates to a method and apparatus for storing and receiving records in a computer system. More specifically, this invention applied multiple hash functions to the key(s) of a record to generate multiple hash addresses where the key(s) or pointer(s) to the key(s) is(are) stored.

DESCRIPTION OF THE PRIOR ART

It is often necessary to compare a given bit string to a large reference set of bit strings. In the case of exact match, it is possible to employ hash table techniques, by means of which, given a hash table of sufficient size, it is possible to reduce the number of comparisons to O(1). However, in the case of inexact match, where the "best" match is, in some sense not defined, conventional hash techniques cannot be used.

To make the problem concrete, consider the case of detecting duplicates and near duplicates in news stories transmitted by wire services such as AP or UPI. A news story covering the same facts may appear in the transmission numerous times, to correct minor errors or to add new information. These repetitions make the raw wire unsuitable for experiments involving frequencies of words, word sequences, etc., since the repetitions inflate the frequencies of rare words beyond their "real" frequency in the language. One possible means of detecting these repetitions is to compute an n-bit signature vector for each story, using, e.g., the rare words occurring in the story, (or any other story characteristics desired). The signature vector, which could be considered as a key, for a new story is stored in the memory with a pointer to the text. As each story is received, its signature vector is compared to each of those for earlier stories, and vectors which are "similar enough" are taken to indicate essential identity of the stories to which they point. As the number of stories grows, the number of comparisons necessary grows linearly with the number of stories, and soon takes unacceptable time. Since the signature vectors need not match exactly, a simple hash function on the signature vectors will not succeed, since vectors differing in only one bit might have very different values for the hash function, however it is computed.

U.S. Pat. No. 4,290,105 to Cichelli et al discloses the application of a plurality of hash functions where only a bit is stored at a corresponding hash address and not an entire key or pointer to the key. Thus, this patent requires exact matching of keys.

U.S. Pat. No. 3,681,781 to Batcher discloses the application of a number of hash functions, which yield hash addresses which correspond to coordinates in N space. All hash values are summed to yield a single storage address. All keys are assumed correct in the most significant digits.

Zorbist et al discloses the use of multiple hash functions without inexact matching. See Reference 1 below.

U.S. Pat. No. 5,032,987 to Broder et al uses multiple hash functions to arrive at a unique address for every key to avoid linear searching in a string of hash collisions. Also, with Broder's invention, a given key is stored in only one location, thereby precluding the inexact matching of keys.

European Patent Application 0233401 discloses matching of dissimilar strings of characters by using special hardware to test for incorrect, missing or extra characters. This patent, however, does not disclose the use of hashing.

U.S. Pat. No. 4,433,392 to Beaven discloses the matching of dissimilar strings of characters by using special hardware to test for matches within a predetermined distance. No hashing is disclosed.

U.S. Pat. No. 4,961,139 to Hong et al discloses the use of multiple hash tables where one hash table per field of a multi-field data base to provide for rapid data retrieval.

U.S. Pat. No. 4,922,417 to Churm et al discloses a method for generating a hash address for a character string.

U.S. Pat. No. 4,897,785 to Zuger discloses a method for computing a hash function and a compare circuit for comparing suitably manipulated keys for exact match to the hash value.

U.S. Pat. No. 4,780,816 to Connell discloses a method for generating hash addresses which are claimed to be randomly distributed. References 3 through 5 all disclose methods of calculating hash addresses, not matching.

U.S. Pat. No. 4,991,087 to Burkowski et al discloses the use of a hashing function to compute a word signature where the hash values are used to create document signatures.

In Reference 3, Carter et al teach a method of calculating hash addresses by choosing hashing functions which provide optimal retrieval times.

In Reference 4, Winters discloses a method for calculating hash addresses involving subdividing a key space.

In Reference 5, Ellis describes a method of hashing which avoids the need to specify the size of a hash table in advance.

Reference 6 discloses a number of algorithms for inexact matching of strings. These include matrix based on known error patterns, such as "elastic matching" and speech recognition and probability analysis. This paper also discusses a soundex code to arrive at a unique representation for names which are spelled differently but pronounced the same.

Reference 7 describes a technique for producing a signature for a text. This method could be used to generate keys for the records of applicant's invention.

In Reference 8 below, Malcom Harrison discloses the building of a character string by computing a hash address in a bit string which is used as a signature for the character string. This article describes only tests to see if one string is the substring of another, and does not use multiple hashes on the whole string.

In reference 9, C. Faloutsos and S. Christodoulakis discuss methods for generating "signatures", roughly equivalent to keys, for documents.

SUMMARY OF THE INVENTION

It is an object of this invention to provide a faster and more reliable means for determining whether a record, or a edited version thereof, is stored in a computer system.

It is another object of this invention to provide for the rapid inexact matching of keys. Accordingly this invention provides a method and apparatus for determining whether a record, or an edited version thereof, is stored in a computer system. When one wishes to store a record in the system, a key is selected for the record to be stored and a number of hash addresses generated from the key by applying a hash function to a number of subsets of the key. Then, a key, or a pointer thereto, is stored at each of the hash addresses that were generated. When one wishes to retrieve a record, or an edited version thereof, from the system a number of hash addresses are generated by applying the hash function to the subsets of the key which is to be checked as to whether it is stored in the system. If there is a key or pointer stored at one or more of the addresses, the key for the test record is then compared with the key that is stored or pointed to in the latter generated hash addresses. Finally, the test record is accepted as being stored in the system if the key for the test record is sufficiently close to any key stored in the latter generated hash addresses, where "sufficiently" is determined by factors not considered here.

BRIEF DESCRIPTION OF THE DRAWINGS

FIG. 2 graphically illustrates a random number table to be used in selecting subsets of a key for generating a number of hash addresses for each key.

DESCRIPTION OF THE PREFERRED EMBODIMENT

Figure 1:
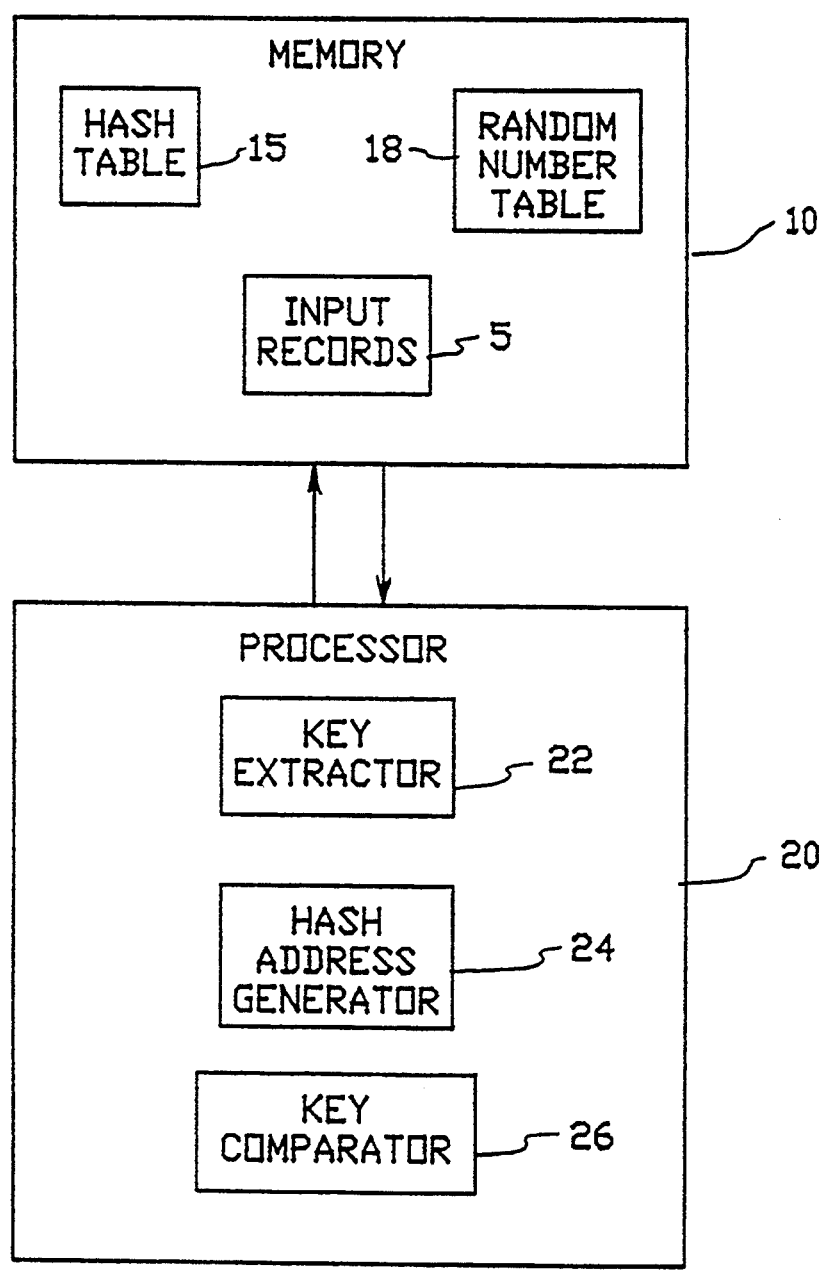
FIG. 1 graphically illustrates the apparatus of this invention. More specifically, the major elements of the memory and the processor are illustrated.

Shown in FIG. 1 is a schematic illustration of the overall apparatus used to implement the invention. Shown is memory 10 containing input records 5, hash table 15, and random number table 18. Also shown, are processor 20 with key extractor 22, hash address generator 24, and key comparator 26.

This invention is primarily concerned with an efficient method of determining whether a given record, or an edited version thereof, is stored in memory. With this invention, whenever an input record is stored in memory 10, key extractor 22 is used to extract a key from the record to be stored. Then, random number table 18, also referred to as table T, and hash address generator 24 are used to generate a number of hash addresses in hash table 15. This method of selecting subsets of the key is only one alternative which might be used. Any method of selecting subsets of the key such that the R hash addresses are different could be used. If the method used produces unsatisfactory results, then a different selection method should be employed. Then, the extracted key is stored at each hash address in hash table 15. Whenever one wishes to test whether a rest record is stored in memory 10, key extractor 22 extracts a key from the test record. Then, as described above, the random number table 18 and hash address generator 24 are used to generate a number of hash addresses from the key that was extracted from the test record. Then, key comparator 26 is used to compare the key extracted from the test record with each key that is stored in the hash addresses that are generated from the key extracted from the test record.

FIG. 2 is a schematic illustration of random number table 18 of FIG. 1. This table has R=7 rows corresponding to the number of hash addresses generated in this particular embodiment for each key. This table also has N=9 columns which determine how many segments each key is divided into for hashing.

Figure 3:
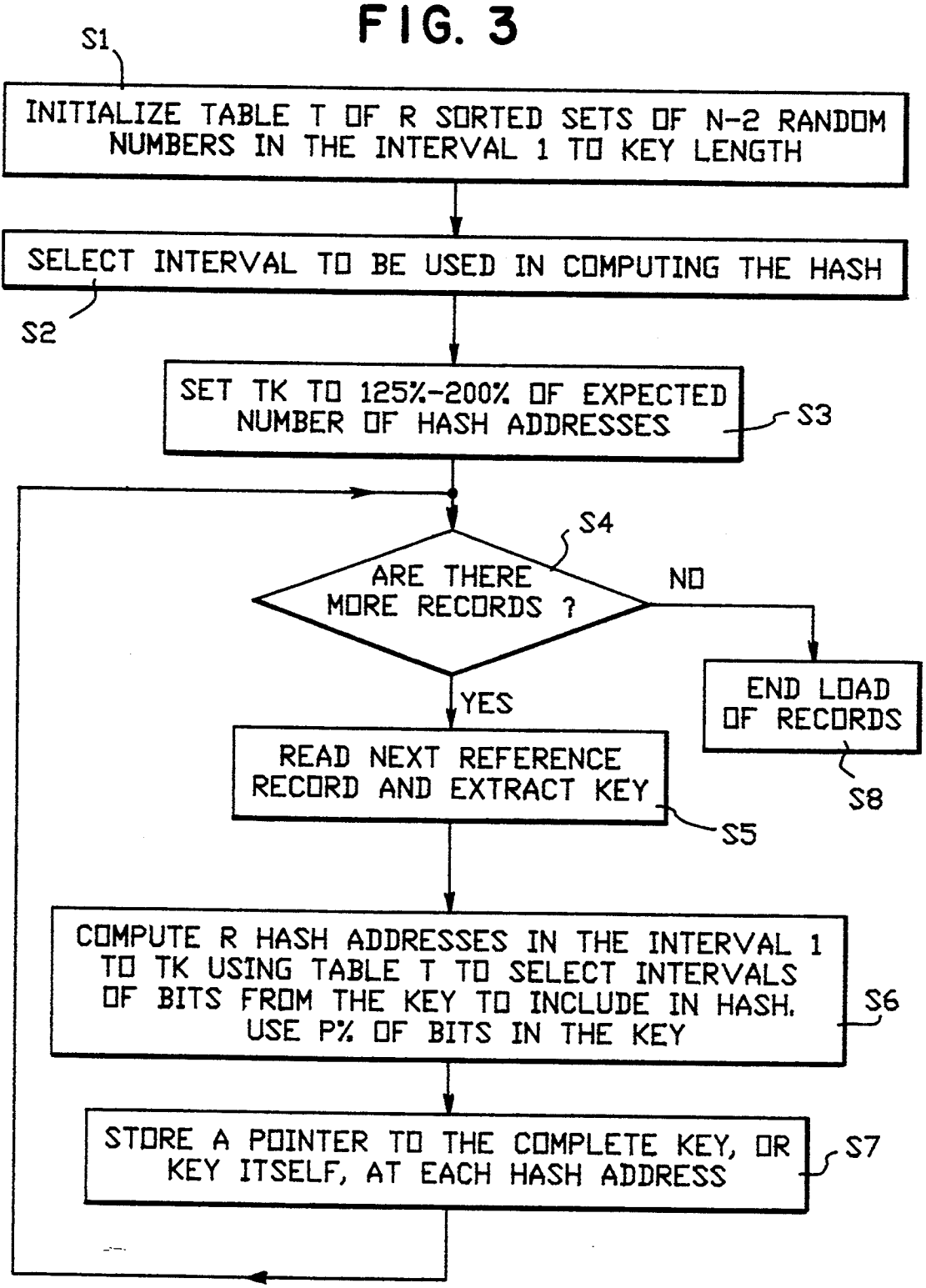
FIG. 3 is a flowchart graphically illustrating the method of storing records according to this invention.

Steps S1 through S8 refer to FIG. 3

S1. The number R, which is the number of hash addresses to be computed for each key, is an implementation determined parameter, which depends partly on the choice of P, (Step S2 below). In general, one wants R to be sufficiently large that essentially every bit in the original key will be used in at least one hash address. For example, if each of the R hash addresses is based on half the bits of the original key, then if R=7 there is a less than one percent chance that some bit of the key will not be used in any address. In this implementation, the particular bits used for each key are chosen by extracting sequences of bits from the whole key. The parameter N determines how many segments a key will be divided into in selecting bits for the hash. Each number in the list of N numbers is the starting point of an interval of bits in the key; ending points of an interval are the next number in the sequence minus one, except for the last number which is used without subtraction. The N numbers are chosen by invoking a random number generator N−2 times to pick numbers in the interval 1 to the key length. The resulting sequence is sorted and stored in the Rth row of table T, FIG. 1, for use in step S6 and step S12. In this example table, each key is 256 bits long, and is broken into eight intervals. The third sequence of intervals, for example, is bits 1–9, 10–22, 23–64, 65–93, 94–207, 208–212, 213–232, 233–256.

S2. The percentage P of bits to use from the key in computing a hash address depends on the application. If the number of one bits in a key is very small (large) then one wants to use proportionally many(few) bits, or the resulting hash address will be all zeros (ones). For typical applications, one can use P=50%. In the implementation described, P is a target percentage. Because of the method of construction of table T, choosing one half of the intervals to compute a hash will normally not use exactly half the bits, since the sequences are of random length. In this implementation, the odd sequences of bits are used when R is odd, and the even sequences used when R is even, although the choice is entirely arbitrary. In the case of R=3, the sequences used to compute the keys are 1–9, 23–64, 94∝207, 213–232. On average, half the bits will be used, although in this example 185 or 73% of the bits are used.

S3. The size of the hash table TK, where the keys or pointers to the keys are stored, depends on the total number of keys. In general, a hash table should be less than 80% full, to avoid having too many collisions of hash addresses. For a discussion of the details of hash table methods, including hash table size, handling of overflows, etc., see reference (2).

S4. This step is merely loop control for the preferred implementation. Once the "no"exit is taken, all keys have been stored with each one accessible from any of R hash addresses.

S5. Each record should be identified by a unique key. Details regarding keys in data base systems can be found in reference (1). In a mailing list application, for example, a key might be the sequence of name, street address and zip code. In the document identification example, a key is constructed from the rare words of the document. Each rare word is used to compute a hash address in the range 1–256. The address is used to set a bit in a document signature string to one. The resulting bit string is the key for a document.

S6. The hash function is applied to the reduced set of bits (from step 2). The function can be any standard hash function, i.e., division, mid-square, etc., see reference (1).

S7. From each hash address in step 2, it must be possible to access the original key. It is immaterial whether the key or simply a pointer to it is stored in the hash table.

S8. At this point, the initial set of reference keys for the data base records have been stored either in the hash table, or in an auxiliary table with pointers from the hash table.

Figure 4:
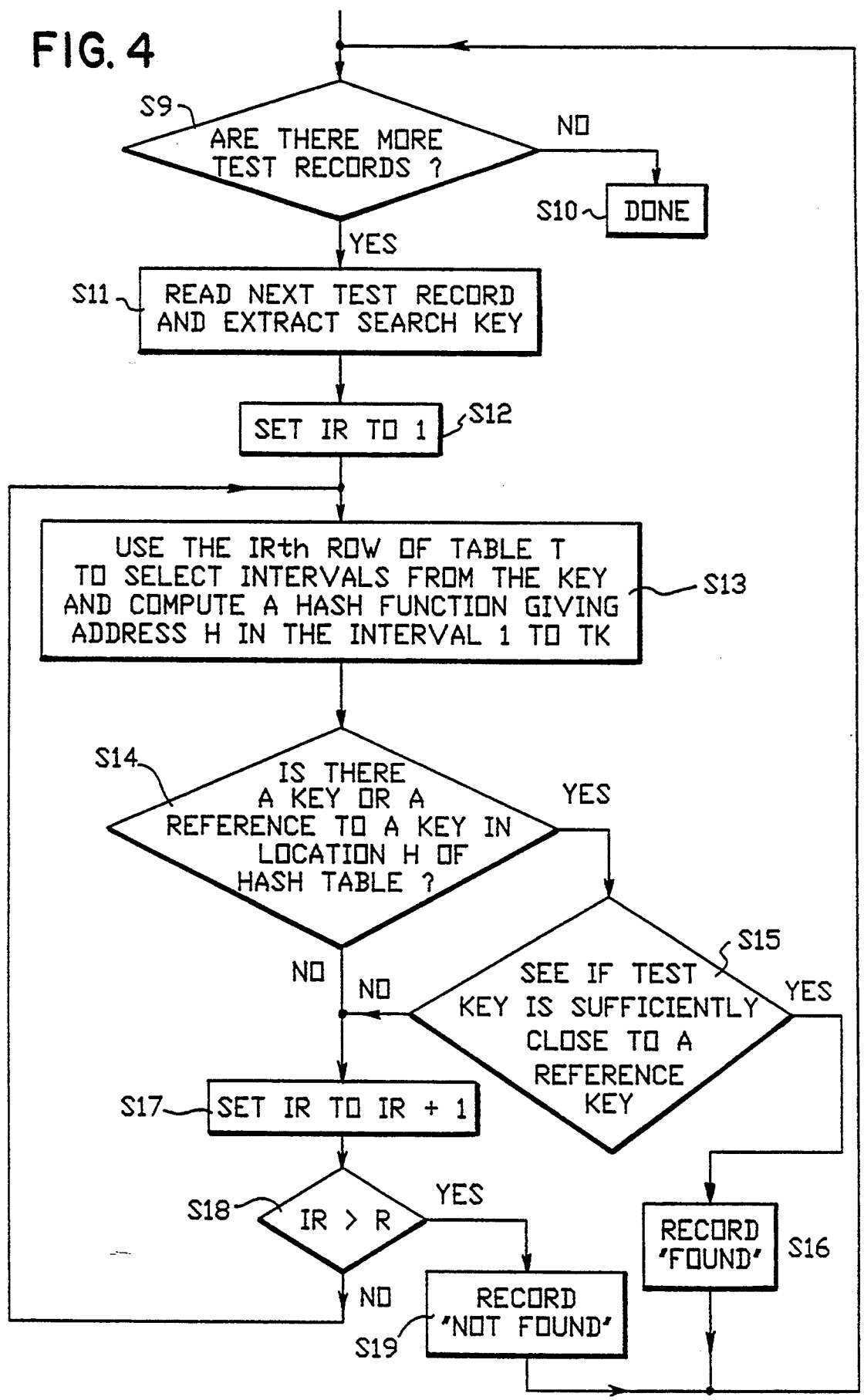
FIG. 4 is a flowchart graphically illustrating the method of retrieving records according to this invention.

Steps S9 through S19 refer FIG. 4.

S9. This step is loop control on the keys to be tested for membership in the reference set.

S10. The DONE block performs application dependent terminal processing, not germane to this application.

S11. As before, each test record should have a unique key. In the case of testing for duplicate documents, the key is a signature computed from the rare words, as described above.

S12. The inner loop S13 through S18 will be iterated up to R times in an attempt to find a match for the test key in the set of reference keys. Because the test keys are not expected to match the reference keys exactly, a hash address must be found which uses only bits that do match, hence the necessity for using more than one hash, and omitting different bits in each hash address computation.

S13. Hash addresses are computed in the same manner as was shown above in storing records.

S14. The key at or the key pointed to at computed hash address may not match any key from the reference set exactly, either because it has errors or because it is indeed not included in the reference set. In the text retrieval example, an 80% match of bits is sufficiently close. This means that two documents have most of their rare words in commons.

S15. Even when the hash addresses match, comparison must be made to the full key. In this invention, the test for goodness of fit between a test key and a reference key is application dependent. It might be percentage of matching bits, so called elastic matching, or any other method of approximate match of bit strings described in the literature.

S16. The action taken in the case of successful match is application dependent.

S17. If there is not match, another hash address, using different bits from the key, is to be computed.

S18. No more than R hash address are computed for each input key.

S19. If no match is found, some application dependent action is taken and the next key corresponding to the next input record is tested. The application dependent action may include storing this new key into the reference set, thereby augmenting the data base.

References

1. R. R. Carlson, Jr. and A. L. Zorbist, DETECTION OF COMBINED OCCURRENCES, Communications of the ACM, Vol. 20, No. 1, January, 1977, pp. 31–35.
2. C. J. Date, AN INTRODUCTION TO DATABASE SYSTEMS, Vol. 1, Fifth edition, Addison-Wesley Publishing Company, 1990.
3. J. L. Carter, and M. N. Wegman, UNIVERSAL CLASSES OF HASH FUNCTIONS, Proceedings of the 1978 IBM Symposium on Mathematics and Computation, Vol. 1, San Jose, Calif., March, 1978, pp. 329–342.
4. V. G. Winters, MINIMAL PERFECT HASHING FOR LARGE SETS OF DATA, Advances in Computing and Information-ICCI'90, International Conference Proceedings 1990, pp. 275–284.
5. C. S. Ellis, CONCURRENCY IN EXTENDABLE HASHING, Inf. Syst. (UK) Vol. 13, No. 1, 1988, pp. 97–109.
6. G. R. Dowling, and P. A. V. Hall, APPROXIMATE STRING MATCHING, Computing Surveys, Vol. 12, No. 4, December, 1980, pp. 381–402.
7. W. B. Croft, and P. Savino, IMPLEMENTING RANKING STRATEGIES USING TEST SIGNATURES, ACM Transactions on Office Information Systems, Vol. 6, No. 1, January, 1988, pp. 42–62.
8. M. C. Harrison, IMPLEMENTATION OF THE SUBSTRING TEDXT, CACM, Vol. 14, No. 12, 1971.
9. C. Faloutsos and S. Christodoulakis entitled, SIGNATURE FILES: an ACCESS METHOD FOR DOCUMENTS AND ITS ANALYTICAL PERFORMANCE EVALUATION, ACM Transactions on Office Information Systems, Vol. 2, No. 4, October 1984, pp. 267–288.

Having thus described my invention, what I claim as new and desire to secure by Letters Patents is:

1. In a computer system, a method of determining whether records or edited versions thereof, are stored in said system, said method comprising:
   whenever storing a first record in said system:
   (a) selecting a first key for said record to be stored in said system;
   (b) generating a plurality of first hash addresses from said first key by applying a hash function to a plurality of different subsets of said first key;
   (c) storing said first key, or a pointer thereto, in each of said first hash addresses;
   when determining whether a second record, or an edited version thereof, is stored in said system:
   (d) generating a plurality of second hash addresses by applying said hash function to said plurality of different subsets of a second key for said second record which is to be checked as to whether it is stored in said system;
   (e) comparing said second key with each key stored in or pointed to in said second hash addresses; and
   (f) accepting said record as being stored in said system if said second key has a selected minimum number of elements which match elements in corresponding positions of any key stored in said second hash addresses.

2. A method as recited in claim 1 wherein said first key and said second key are a bit stream of N bits.

3. A method as recited in claim 2 wherein said second key is sufficiently close to a key stored in one of said second hash addresses if at least a minimum percentage of bits of said second key matches a minimum percentage of bits of said key in one of said second hash addresses.

4. A method as recited in claim 3 wherein said minimum percentage is 80%.

5. In a computer system, an apparatus for determining whether records or edited versions thereof, are stored in said system, said apparatus comprising:

for storing a first record in said system, said apparatus comprising:

means for selecting a first key for said record to be stored in said system;

(b) means for generating a plurality of first hash addresses from said first key by applying a hash function to a plurality of different subsets of said first key;

(c) means for storing said first key, or a pointer thereto, in each of said hash addresses;

for determining whether a second record, or an edited version thereof, is stored in said system, said apparatus comprising:

(d) means for generating a plurality of second hash addresses by applying said hash function to said plurality of different subsets of a second key said second record which is to be checked as to whether it is stored in said system;

(e) means for comparing second key with each key stored in or pointed to in said second hash addresses; and (f) means for accepting said second record as being stored in said system if said second key has a selected minimum number of elements which match elements in corresponding positions of any key stored in said second hash addresses.

6. In a computer system, a method of determining whether records or edited versions thereof, are stored in said system, said method comprising:

whenever storing a first record in said system:

(a) selecting a first key for said record to be stored in said system;

(b) generating a plurality of first hash addresses from said first key by applying a hash function to a plurality of different subsets of said first key;

(c) storing said first key, or a pointer thereto, in each of said first hash addresses;

when determining whether a second record, or an edited version thereof, is stored in said system;

(d) generating a plurality of second hash addresses by applying said hash function to said plurality of different subsets of a second key for said second record which is to be checked as to whether it is stored in said system, where said second key is not identical to said first key;

(e) comparing said second key with each key stored in or pointed to in said second hash addresses; and (f) accepting said second record as being stored in said system if said second key has a selected minimum number of elements which match elements in corresponding positions of any key stored in said second hash addresses.

* * * * *